United States Patent [19]

Lachman et al.

[11] 3,950,175

[45] Apr. 13, 1976

[54] PORE SIZE CONTROL IN CORDIERITE CERAMIC

[75] Inventors: Irwin M. Lachman, Corning; Rodney D. Bagley, Big Flats, both of N.Y.

[73] Assignee: Corning Glass Works, Corning, N.Y.

[22] Filed: Nov. 5, 1973

[21] Appl. No.: 412,863

[52] U.S. Cl. ................................. 106/40 R; 106/62
[51] Int. Cl.² ........................................ C04B 35/06
[58] Field of Search.................... 106/39.5, 62, 40 R

[56] References Cited
UNITED STATES PATENTS

| | | | |
|---|---|---|---|
| 2,103,746 | 12/1937 | Guth | 106/40 R |
| 2,271,845 | 2/1942 | Parsons | 106/40 R |
| 2,731,355 | 1/1956 | Skinner | 106/62 |
| 3,150,988 | 9/1964 | Dess et al | 106/40 R |
| 3,150,989 | 9/1964 | Parsons | 106/40 R |
| 3,199,992 | 8/1966 | Moffitt | 106/40 R |
| 3,271,323 | 9/1966 | Whittemore | 106/40 R |
| 3,341,339 | 9/1967 | Stein | 106/40 R |
| 3,649,315 | 3/1972 | Booth | 106/40 R |

FOREIGN PATENTS OR APPLICATIONS

| | | | |
|---|---|---|---|
| 886,718 | 1/1962 | United Kingdom | 106/40 R |

*Primary Examiner*—Patrick P. Garvin
*Assistant Examiner*—John F. Niebling
*Attorney, Agent, or Firm*—Barry S. Bissell; Richard N. Wardell; Clarence R. Patty, Jr.

[57] ABSTRACT

Coarse porosity is imposed in fired ceramic bodies containing cordierite ($2MgO.2Al_2O_3.5SiO_2$) primary phase by substituting pyrophillite, kyanite, quartz, or fused silica in the batch composition in place of the usual raw talc or clay or a portion thereof.

13 Claims, No Drawings

3,950,175

PORE SIZE CONTROL IN CORDIERITE CERAMIC

FIELD OF INVENTION

Porosity in a fired ceramic is known to affect and control various physical and mechanical properties of the fired body. For example, thermal shock resistance, thermal conductivity, mechanical strength, and other physical properties such as surface area and weight are related to the porosity of the body. Control of the porosity, therefore, is one factor in controlling the related properties of the body.

The prior art in this area is mainly concerned with the control of the apparent porosity or the true porosity of the fired body without regard to the size distribution of pores. Various methods have been suggested for inducing total porosity into a body. One concerns formulating the batch with coarse raw materials or grog, or with binders and fillers which may be burned out at low temperatures. Another uses raw materials which decompose during thermal processing to evolve gas bubbles. In U.S. Pat. No. 1,818,506 it is suggested that quartz transformations tend to maintain a high porosity in the fired body. Again, however, most work has been done with either total porosity or open porosity in the fired ware and not upon coarse porosity or size distribution of pores.

British Patent No. 886,718 does disclose a pyrophillite addition to cordierites but the disclosed compositional limits are outside the present invention. Information of porosity dependence is also absent.

The present inventors are concerned with coarse porosity within the fired ceramic and have found that several raw materials indeed produce this coarse porosity. The large pores are particularly attractive because of the resultant rough surface of the fired body which promotes the adhesion and retention of coatings and catalysts applied to the ceramic.

SUMMARY

The present applicants have found that coarse porosity, measured by the mean pore size or the percentage of pores greater than 10 microns in diameter, may be induced in a magnesium-alumino-silicate ceramic with cordierite primary phase by substitution of kyanite, pyrophillite, quartz, and/or fused silica for a portion of or the entire quantity of a clay raw material. The substitution may require the proportions of other nonsubstituted raw materials to be altered in order to formulate the oxide composition to yield at least 70 volume percent cordierite phase upon sintering.

An object of the present invention is to produce a fired cordierite ceramic with a total apparent porosity of at least 25 percent.

Another object of the invention is to control the pore size distribution of pores greater than 10 microns in a cordierite fired ceramic.

A further object of the invention is to control the pore size distribution such that at least 20 percent (preferably 30–65 percent) of the open pores in the fired body are larger than 10 microns in diameter.

In furtherance of these objectives the applicants have found that reformulation of raw materials for producing cordierite using at least one of the materials selected from kyanite, pyrophillite, quartz, and fused silica results in an increase in the pore size in the sintered body.

DETAILED DESCRIPTION

The present invention concerns the coarse porosity in cordierite fired ceramics. The term "coarse porosity" as used herein is chosen to mean the percentage of all open pores (measured volumetrically as the apparent porosity) which are larger than 10 microns in diameter. The relative size of pores in a fired body may also be compared using the mean pore size (M.P.S.) of open pores. Both the coarse porosity and the M.P.S. are obtained herein by the mercury intrusion method of porosity determination.

Cordierite ($2MgO.2Al_2O_3.5SiO_2$) is commonly obtained in a fired ceramic by blending a mixture of clay, talc and alumina, together with necessary forming aids, into a plastically deformable batch and subsequently forming the plastic batch by any conventional ceramic forming method, such as pressing, rolling, or extrusion. The green body is then dried and sintered in a narrow temperature range of approximately 1340°–1450°C., depending on the exact batch composition and impurities.

The above processing and sintering of cordierite ware would typically yield a body with apparent porosity of 20–45 percent, but with a coarse porosity of below 10 percent. The present inventors have found that with selected raw materials, the coarse porosity can be increased several times although the total apparent porosity remains relatively constant. This increase in coarse porosity occurs when kyanite, pyrophillite, quartz or fused silica is substituted for all or a portion of the clay. The coarse porosity increases even though the substituting materials are of equal or smaller particle size with respect to the raw material being removed. In this respect, the inventors prefer to use raw materials which are −325 Tyler mesh, except the quartz and fused silica which are preferably −200 Tyler mesh.

The quantity of kyanite, pryophillite quartz, and/or fused silica to be substituted may vary from a portion of the clay in the base composition up to the entire amount. Some routine experimentation may be required to optimize other properties of the cordierite with the coarse porosity. In general, the coarse porosity is linearly related to the quantity of substituting raw material, and other properties such as firing shrinkage, or thermal expansion, may be negatively affected in a similar manner. This result suggests that the quantity of substituting raw material should be controlled to optimize the desired properties.

In particular, a typical cordierite batch composition will consist of 35–45% raw talc, 30–45% clay and 15–25% alumina. Coarse porosity could be obtained by substituting, 30–45% kyanite or pyrophillite for the clay or 30–45% quartz or fused silica (plus an $Al_2O_3$ adjustment) for the clay. However, the inventors prefer to limit the substitution to preserve other desirable properties, such as a low coefficient of thermal expansion. They have found that, for optimum results, a substitution of at least one raw material in the proportions: 5–20% kyanite, 5–15% pyrophillite, and 1–15% quartz or fused silica is sufficient. The inventors further prefer the silica raw materials to have a particle size finer than 200 Tyler mesh and the other raw materials to have a particle size finer than 325 Tyler mesh. The firing temperature is preferably 1375°–1425°C. in order to bring about the necessary sintering of the mass.

As noted earlier, after an equal percentage substitution of raw materials, the nonsubstituted materials may have to be increased or reduced in a corrective or chemically balancing reformulation of the batch so that the composition will yield a ceramic with a primary cordierite phase upon sintering. This would be especially true with the quartz or fused silica substitution where a complementary addition of $Al_2O_3$ may be necessary. The other substitutions are between very similar materials (compositionally) so that very little corrective reformulation is necessary.

PREFERRED EMBODIMENTS

In the following examples the raw materials have oxide weight analyses as shown in Table 1.

Table 1

| Raw Materials | MgO | $Al_2O_3$ | $SiO_2$ |
|---|---|---|---|
| Georgia Kaolin Hydrite MP Clay (A.P.S. = 9.7) | 0.03 | 39.1 | 45.4 |
| Pfizer MP 50-35 Montana Talc (A.P.S. = 11) | 32.2 | 0.93 | 61.1 |
| Pfizer MP 96-28 Montana Talc (A.P.S. = 20) | 31.2 | 0.86 | 61.4 |
| Pfizer MP 99-54 Calcined Talc (A.P.S. = 25) | 33.4 | 1.07 | 64.5 |
| Alcoa Hydral 705 Aluminum Hydroxide (A.P.S. = .77) | — | 64.1 | 0.04 |
| Alcoa Hydral 710 Aluminum Hydroxide (A.P.S. = 1.4) | — | 64.7 | 0.04 |
| Alcoa A-2 (−325 mesh) $Al_2O_3$ (A.P.S. = 5.8) | — | 99.2 | 0.02 |
| Alcoa A-16 $Al_2O_3$ (A.P.S. = 1) | — | 99.5 | 0.08 |
| Raw Virginia Kyanite (A.P.S. = 2.3) | 0.07 | 56.5 | 40.3 |
| Pyrophillite (A.P.S. = 16) | — | 22.0 | 70.4 |
| Penn. Glass Sand Corp. Minusil quartz (A.P.S. = 10) | — | 0.10 | 99.7 |
| Glasrock GP-11 Fused Silica (A.P.S. = 33) | — | 0.20 | 99.6 |

A.P.S. = AVERAGE PARTICLE SIZE IN MICRONS

EXAMPLE 1

Kyanite Substitution

Kyanite is responsible for coarse porosity in cordierite ceramics when substituted for clay in the raw batch. Bodies 5 and 6 were prepared with batch compositions as shown. The raw materials were ball milled and then blended with water and common binders and plasticizers, such as methyl cellulose and diglycol stearate, into a plastically formable batch and then extruded to one inch diameter honeycomb substrates. The mean pore size (M.P.S.) was determined by the mercury intrusion method.

|  | 5 | 6 |
|---|---|---|
| Pfizer MP 96-28 Montana Talc | 19.8 | 20.0 |
| Pfizer MP 99-54 Calcined Talc | 19.4 | 20.3 |
| G. K. Hydrite MP Clay | 40.2 | 30.7 |
| Raw Virginia Kyanite | — | 11.5 |
| Alcoa Hydral 710 Aluminum Hydroxide | 16.9 | 14.4 |
| Alcoa A-2 $Al_2O_3$ (−325 mesh) | 3.7 | 3.1 |

The samples were fired at 1425°C. for 6 hours and the coarse porosity was examined. The M.P.S. and the percentage of pores larger than 10 microns were increased greatly in the body formulated with kyanite.

| Body | % Open Porosity | M.P.S. (microns) | % Pores Larger than 10 Microns |
|---|---|---|---|
| 5 | 35 | 3.3 | 21 |
| 6 | 37 | 12.6 | 55 |

EXAMPLE 2

Pyrophillite Substitution

Pyrophillite raw material yields coarse porosity when substituted for clay. The following batch compositions were prepared as described in Example 1.

|  | 7 | 8 |
|---|---|---|
| G. K. Hydrite MP Clay | 40.0 | 15.4 |
| Pyrophillite (−200 mesh) | — | 15.4 |
| Pfizer MP 50-35 Talc | 38.0 | 38.2 |
| Alcoa Hydral 705 Aluminum Hydroxide | 22.0 | — |
| Alcoa Hydral 710 Aluminum Hydroxide | — | 31.0 |

Firing sample 7 to 1415°C. for 24 hours and sample 8 to 1415°C. for 12 hours gave the coarse porosity as shown. The increase in coarse porosity is evident in the pyrophillite body even though the heating schedule favors coarse porosity for sample 7.

| Body | % Open Porosity | M.P.S. (microns) | % Pores Larger than 10 microns |
|---|---|---|---|
| 7 | 35 | 4.3 | 9.1 |
| 8 | 36 | 6.4 | 32.0 |

It is noteworthy that the apparent porosity is not increased, but the size of the pores is increased.

EXAMPLE 3

Quartz Substitution

Samples were prepared as in Example 1 using a base composition 9 and a composition 10 which is similar to 9, but with a 9.1 percent substitution of quartz (and a 10.4 percent make-up of $Al_2O_3$) for the clay.

|  | 9 | 10 |
|---|---|---|
| G. K. Hydrite MP | 40.0 | 20.0 |
| Penn. Glass Sand Minusil Quartz | — | 9.1 |
| Pfizer MP 50-35 Montana Talc | 38.0 | 38.5 |
| Alcoa Hydral 710 Aluminum Hydroxide | — | 17.8 |
| Alcoa Hydral 705 Aluminum Hydroxide | 22.0 | — |
| Alcoa A-2 $Al_2O_3$ | — | 7.3 |
| Alcoa A-16 $Al_2O_3$ | — | 7.3 |

Body 9 was fired to 1415°C. for 24 hours and body 10 was fired to 1415°C. for 12 hours. Notice the longer soak time should have favored coarse porosity in Body 9. The actual coarse porosity however was as shown:

| Body | % Open Porosity | M.P.S. (microns) | % Pores Larger than 10 microns |
|---|---|---|---|
| 9 | 34 | 4.3 | 9.1 |

-continued

| Body | % Open Porosity | M.P.S. (microns) | % Pores Larger than 10 microns |
|---|---|---|---|
| 10 | 41 | 7.8 | 34.0 |

The increased coarse porosity is not caused merely by phase transformations of quartz. Prior art has disclosed that total porosity may be increased by these transformations but no mention is made of coarse porosity. In addition, the experimental data show that the coarse porosity does not appear in the fired ware until well after the reconstructive transformation to tridymite at 867°C. Instead rapid development of coarse porosity occurs at about 1325°–1350° when liquid begins to form. This would indicate that the phase transformation is not the prevailing cause of the coarse porosity.

EXAMPLE 4

Fused Silica Substitution

To demonstrate that the quartz transformation was not the cause of coarse porosity noted in Example 4, fused silica was substituted for quartz in composition 10. The rest of composition 10 remained the same while 9.1 percent of −200 mesh Glasrock GP-11 fused SiO$_2$ was substituted for the quartz. The coarse porosity, after an identical firing, was actually higher for the fused silica.

| Firing Schedule | Composition 10 (With Fused Silica Substituted for Quartz) | | |
|---|---|---|---|
| | % Open Porosity | M.P.S. (microns) | % Pores Larger than 10 microns |
| 1415°C./ 12 hrs. | 38 | 11.3 | 55 |

What we claim is:

1. A porous, fired ceramic product having at least 70 volume percent cordierite crystals and at least 20 percent of open pores larger than 10 microns in diameter and being made by the process of:
   1. formulating a batch composition using ceramic raw materials analytically containing Al$_2$O$_3$, MgO and SiO$_2$, at least one being −200 Tyler mesh and selected from the group consisting of:
      1 to 17% pyrophillite,
      1 to 40% kyanite,
      1 to 20% quartz, and
      1 to 20% fused silica,
      each of the ceramic raw materials selected in an effective amount for yielding at least 70 volume percent cordierite in the product upon sintering the batch composition;
   2. blending the batch composition into a plastically formable mass;
   3. forming the plastic batch into a green ceramic body; and
   4. firing the green ceramic body at a temperature sufficient to sinter the raw materials and bring about the development of the cordierite crystals.
2. A ceramic product as recited in claim 1 wherein the pyrophillite, kyanite, quartz, and fused silica are selected in the quantities:
   5–20% kyanite,
   5–15% pyrophillite,
   1–15% quartz, and
   1–15% fused silica.
3. A ceramic product as recited in claim 2 wherein the firing temperature is 1340°–1450°C.
4. A ceramic product as recited in claim 2 wherein the apparent porosity of the porous, fired ceramic product is at least 25 percent.
5. A ceramic product as recited in claim 4 wherein 30–65 percent of open pores are larger than 10 microns in diameter.
6. A ceramic product as recited in claim 1 wherein the selected raw material is quartz.
7. A ceramic product as recited in claim 1 wherein the selected raw material is fused silica.
8. A ceramic product as recited in claim 5 wherein the selected raw material is quartz.
9. A ceramic product as recited in claim 5 wherein the selected raw material is fused silica.
10. A method of inducing coarse porosity in a sintered cordierite product such that at least 20% of open pores are larger than 10 microns in diameter by the old method of formulating a batch of ceramic raw materials analytically containing Al$_2$O$_3$, SiO$_2$ and MgO, blending the batch together with forming aids into a plastically formable batch, forming the batch into a green ceramic body, and sintering the green ceramic body to bring about the development of cordierite crystals wherein the improvement comprises
    formulating the batch using at least one pore size control raw material being −200 Tyler mesh and selected from the group consisting of:
      1–17% pyrophillite,
      1–40% kyanite,
      1–20% quartz, and
      1–20% fused silica
    each of the selected ceramic raw materials and the selected pore control raw materials being employed in an effective amount for together forming a batch which when sintered yields a product with at least 70 percent volume percent cordierite phase.
11. The method of claim 10 wherein the pore size control raw material is selected from the group consisting of:
    5–20% kyanite,
    5–15% pyrophillite,
    1–15% quartz, and
    1–15% fused silica.
12. The method of claim 10 wherein the pore size control raw material is quartz.
13. The method of claim 10 wherein the pore size control raw material is fused silica.

* * * * *